(12) United States Patent
Miernik et al.

(10) Patent No.: US 7,155,215 B1
(45) Date of Patent: Dec. 26, 2006

(54) SYSTEM AND METHOD FOR UPGRADING SERVICE CLASS OF A CONNECTION IN A WIRELESS NETWORK

(75) Inventors: Jerzy W. Miernik, Allen, TX (US); Michael E. Humes, Garland, TX (US)

(73) Assignee: Cisco Technology, Inc., San Jose, CA (US)

( * ) Notice: Subject to any disclaimer, the term of this patent is extended or adjusted under 35 U.S.C. 154(b) by 677 days.

(21) Appl. No.: 10/038,989

(22) Filed: Jan. 4, 2002

(51) Int. Cl.
  *H04M 3/42* (2006.01)
  *H04B 15/00* (2006.01)
  *H04Q 7/20* (2006.01)
  *H04L 12/26* (2006.01)
  *H04J 1/16* (2006.01)

(52) U.S. Cl. .............. 455/423; 455/452.1; 455/452.2; 455/453; 455/422.1; 455/414.1; 455/424; 455/62; 455/450; 370/236.1; 370/237; 370/238; 370/238.1

(58) Field of Classification Search .......... 455/452.2, 455/453, 452.1, 422.1, 414.1, 423, 424, 450, 455/62; 370/236.1, 237, 238–238.1
See application file for complete search history.

(56) References Cited

U.S. PATENT DOCUMENTS

| | | | |
|---|---|---|---|
| 6,167,261 A | 12/2000 | Amin | 455/426 |
| 6,169,898 B1 | 1/2001 | Hsu et al. | 455/432 |
| 6,195,532 B1 | 2/2001 | Bamburak et al. | 455/31.1 |
| H2051 H | 11/2002 | Zhu et al. | 370/395.21 |
| 6,564,061 B1 | 5/2003 | Guo et al. | 455/452 |
| 6,631,122 B1 | 10/2003 | Arunachalam et al. | 370/332 |
| 6,640,248 B1 | 10/2003 | Jorgensen | 709/226 |
| 6,708,146 B1 | 3/2004 | Sewall et al. | 704/217 |
| 6,760,312 B1 * | 7/2004 | Hitzeman | 370/252 |
| 6,865,185 B1 * | 3/2005 | Patel et al. | 370/412 |
| 2002/0024964 A1 * | 2/2002 | Baum et al. | 370/419 |
| 2002/0194251 A1 * | 12/2002 | Richter et al. | 709/105 |

FOREIGN PATENT DOCUMENTS

JP     02000209298     *    7/2000

* cited by examiner

*Primary Examiner*—George Eng
*Assistant Examiner*—Michael Thier
(74) *Attorney, Agent, or Firm*—Baker Botts L.L.P.

(57) ABSTRACT

A system and method for upgrading service class of a connection in a wireless network includes identifying a congested CoS in a sector of a wireless network. Bandwidth availability in the sector is determined at an enhanced CoS in relation to the congested CoS. A communications session is selected in the congested CoS for upgrading. The communications session is upgraded to the enhanced CoS.

18 Claims, 3 Drawing Sheets

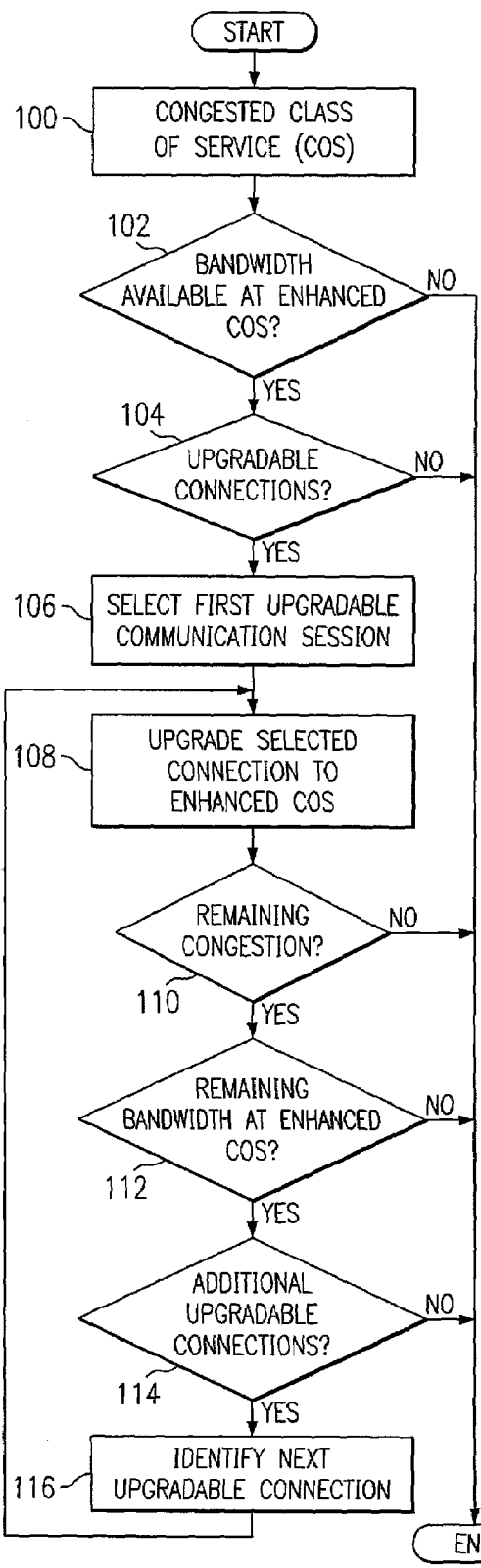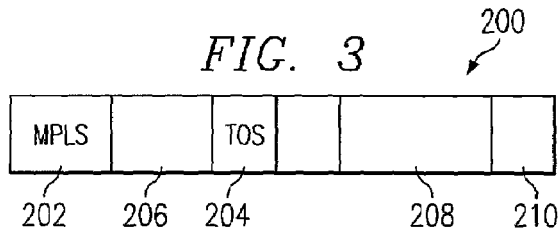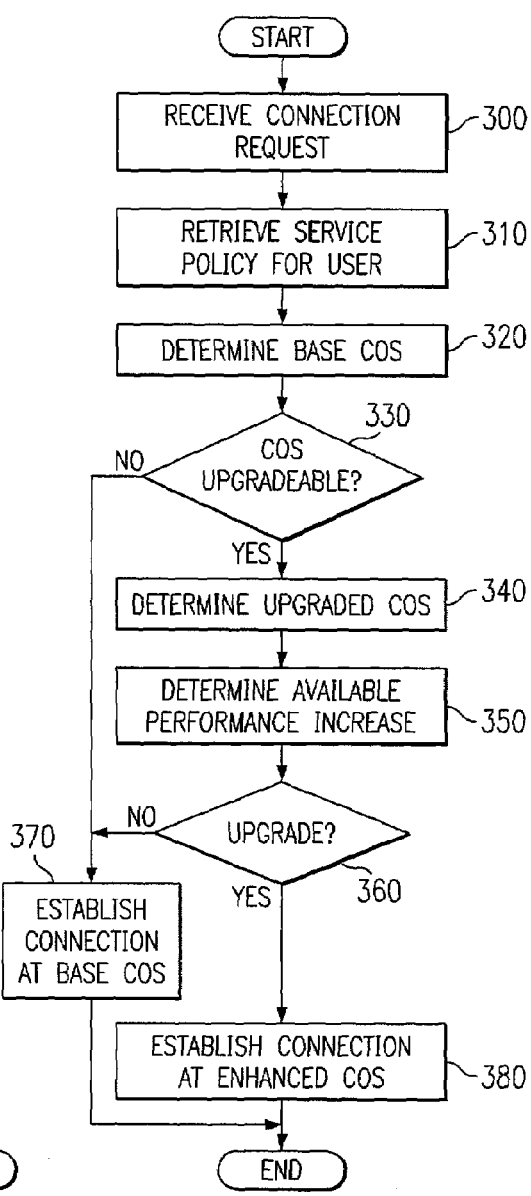

SYSTEM AND METHOD FOR UPGRADING SERVICE CLASS OF A CONNECTION IN A WIRELESS NETWORK

TECHNICAL FIELD OF THE INVENTION

The present invention relates generally to the field of wireless communications, and more particularly to a system and method for upgrading service class of a connection in a wireless network.

BACKGROUND OF THE INVENTION

Wireline and wireless Internet protocol (IP) networks have traditionally supported a best effort delivery of all traffic. To support enhanced services, multiple types, or classes, of services have been established and assigned certain class of service (CoS) parameters that manage queues for each service type.

The CoS parameters include delay, jitter, error rates, and throughput. The CoS parameters can be provisioned on a per IP connection or per flow basis through mechanisms such as resource reservation protocol (RSVP) or can be provisioned on aggregate flow which are classified into service classes. As the customer's CoS increases, so do the resources available to a customer's communications sessions thereby improving the customer's data performance. Internet service providers (ISPs) can utilize the service classes, their associated CoS behavior and CoS provisioning to provide tiered service offerings to their business and consumer customers.

Typically, a customer purchases a service policy or Service Level Agreement (SLA) that associates a CoS with his communication sessions. Data traffic in excess of the allocated bandwidths for a CoS is held or dropped causing delay and/or retransmissions. Consequently, as the CoS becomes congested, the customer's ability to utilize the CoS resources deteriorates.

SUMMARY OF THE INVENTION

The present invention provides a system and method for upgrading service class of a connection in a wireless network that reduce or eliminate problems and disadvantages with previous systems and models. In a particular embodiment, the present invention uses excess bandwidth from one or more classes of service to satisfy demand in a congested CoS.

In accordance with one embodiment of the present invention, a method for upgrading service class of a connection in a wireless network includes identifying a congested CoS for a wireless network. Bandwidth availability is determined for the wireless network at an enhanced CoS in relation to the congested CoS. A communications session is selected in the congested CoS for upgrading. The communications session is upgraded to the enhanced CoS.

Technical advantages of one or more embodiments of the present invention include more efficient use of the bandwidth available in a wireless sector by sharing over-allocated bandwidth between different classes of service. Other advantages may include fewer packet and/or call drops and thus reduced retransmissions. Additionally, call capacity of the network is increased while preventing class starvation by allocating bandwidth to each class and using over-allocated bandwidth for excess traffic in other classes.

Still other technical advantages of one or more embodiments of the present invention include allowing a service provider to increase revenues from enhanced service class subscriptions. Furthermore, wireless network providers can track performance statistics on a per user or per CoS basis. The performance statistics could be used to negotiate new or maintain current SLAs, which could also increase revenues.

These and elsewhere described technical advantages may be present in some, none, or all of the embodiments of the present invention. In addition, other technical advantages of the present invention will be readily apparent to one skilled in the art from the following figures, description, and claims.

BRIEF DESCRIPTION OF THE DRAWINGS

For a more complete understanding of the present invention and its advantages, reference is now made to the following descriptions, taken in conjunction with the accompanying drawings, in which:

FIG. 3 is a diagram of an IP packet with a MPLS label in accordance with one embodiment of the present invention;

FIG. 4 is a flow diagram illustrating a method for upgrading service class of connections in a congested service class in accordance with one embodiment of the present invention; and FIG. 5 is a flow diagram illustrating a method for upgrading service class for a connection at call establishment in accordance with one embodiment of the present invention.

DETAILED DESCRIPTION OF THE INVENTION

Figure 1:
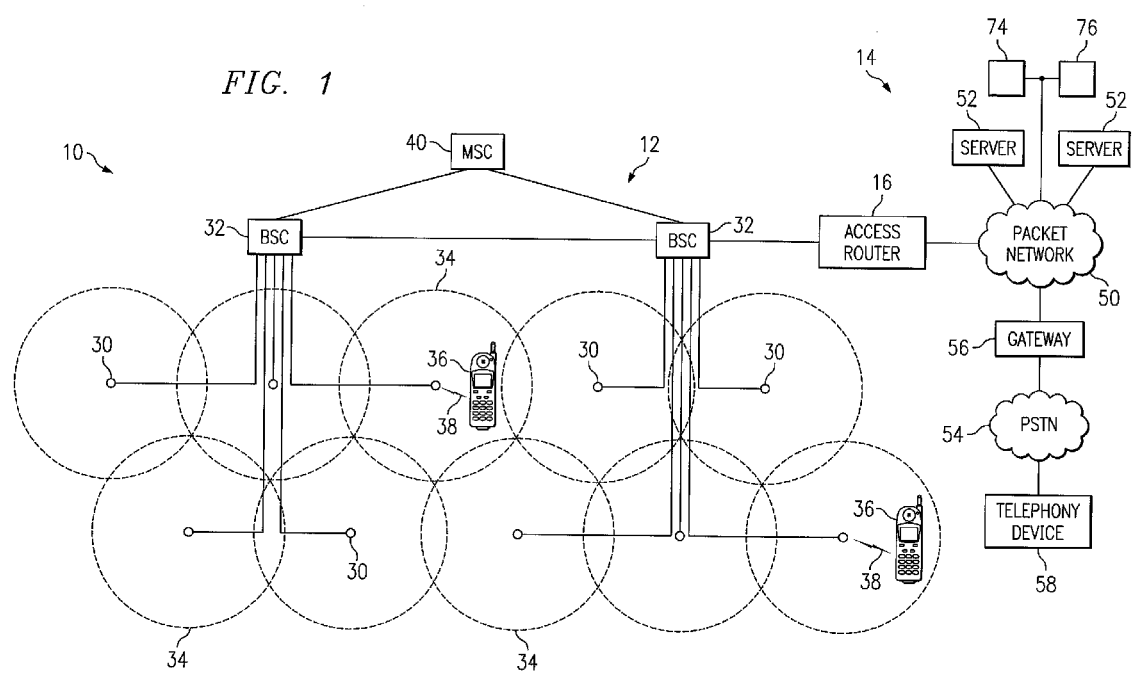
FIG. 1 is a block diagram illustrating a wireless network in accordance with one embodiment of the present invention.

FIG. 1 illustrates a communications system 10 in accordance with one embodiment of the present invention. In this embodiment, the communications system 10 includes a cellular wireless network in which terrestrial wireless transmissions originate in geographically delimited sectors. A sector may comprise one cell, many cells, or a portion of a cell. It will be understood that the present invention may be used in connection with other suitable wireless networks.

Referring to FIG. 1, the communications system 10 includes a wireless network 12 connected to a wireline network 14 through an access router 16. The wireless network 12 and the access router 16 together form a radio access network (RAN). The RAN allows wireless devices to communicate voice, video, data, and other information to the wireline network 14.

In one embodiment, the access router 16 may be a packet data serving node (PDSN). In this and other embodiments, the access router 16 directs traffic between the wireless and wireline networks 12 and 14. It will be understood that connectivity between the wireline and wireless networks 12 and 14 may be otherwise suitably provided without departing from the scope of the present invention.

The wireless network 12 includes a number of base stations (BTSs) 30 connected to base station controllers (BSCs) 32. The BTSs 30 each cover a geographic region, sector or cell 34 of the wireless network 12 and communicate with mobile devices 36 in the cell 34. The mobile devices 36 may be cell phones, data phones, portable data devices, portable computers, handheld devices, handsets, portable network appliances or other suitable devices capable of communicating information over a wireless link 38.

The BSCs 32 are connected to each other, to the access router 16 and to a mobile switching center (MSC) 40. The BSCs 32 and the MSC 40 provide switch and soft handoff functionality for the wireless network 12. In this way, voice, video, data and other information is routed to and from the mobile devices 36 and connections are maintained with the mobile devices 36 as they move throughout, or roam the wireless network 12.

Wireless link 38 is a radio frequency (RF) link. The wireless link 38 may be based on established technologies or standards such as GPRS, EDGE, IS-54 (TDMA), IS-95 (CDMA), GSM and AMPS, 802.11 based WLAN, or more recent technology such as CDMA 2000 and W-CDMA or proprietary radio interfaces. In a particular embodiment, wireless link 38 comprises a code division multiple access (CDMA) link based on a CDMA standard and in which packets are segmented into radio frames for transmission over the wireless interface and reassembled by the receiving device to reconstitute the packets.

The wireline network 14 includes a packet or other suitable core transport network 50 connecting a number of servers 52 and other network devices to each other and to the access router 16. The packet network 50 also connects the access router 16, and thus the wireless network 12 to the public switched telephone network (PSTN) 54 through a voice/PSTN gateway 56. Accordingly, mobile devices 36 may communicate through wireless network 12, packet network 50 and PSTN 54 with standard telephones, clients and computers using modems or digital subscriber line (DSL) connections or other telephony devices 58.

The data transport network 50 may be the Internet, intranet, extranet, or other suitable local or wide area network capable of communicating information between remote end points. For the Internet embodiment, information is transmitted in Internet protocol (IP) packets using transport control protocol (TCP), wireless datagram protocol (WDP), user datagram protocol (UDP) and other suitable protocols and formats may also be used. It will be understood that information may be transmitted in other suitable packets, including asynchronous transport mode (ATM) and other cells or datagrams.

The servers 52 may comprise voicemail servers (VMS), fax/modem servers, short message center (SMSC) servers, conferencing facilities, authentication, authorization, and accounting (AAA) servers, billing servers, home location registers (HLR), home subscriber servers (HSS), domain name servers (DNS), content servers including web sites and pages, push servers and other suitable servers and functionality providing services to mobile devices 36 and/or to wireless and/or wireline connections in the communications system 10.

In one embodiment, the network devices include an upgrade manager 74 and a policy information base 76. The network devices may also be a server or any other suitable device connectable to the packet network 50 and operable to provide content over the network. For example, the network device may be a communication device, a web hosting device, or a client device.

As described in more detail below, upgrade manager 74 selects a network communication for upgrading. Policy information base 76 stores the subscriber level information for users of the wireless network 12. Both upgrade manager 74 and policy information base 76, as well as components of access router 16 and/or of system 10, may comprise logic encoded in media. The logic may comprise software stored on the computer-readable medium, or hardware encoded in a processor card, application specific integrated circuits (ASIC), field programmable gate arrays (FPGA) and the like. The software includes programs, modules, functions, database tables and entries, data, routines, data storage, and other suitable elements.

Figure 2:
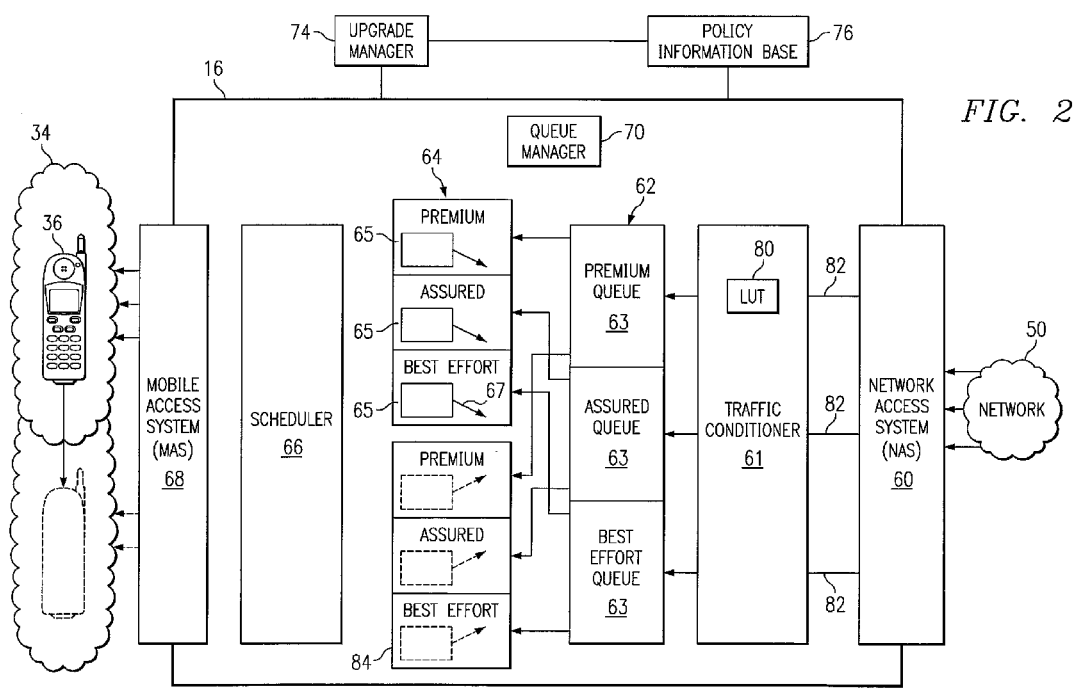
FIG. 2 is a block diagram illustrating details of the access router in the wireless network of FIG. 1 in accordance with one embodiment of the present invention.

FIG. 2 illustrates details of the access router 16 in accordance with one embodiment of the present invention. In this embodiment, upgrade manager 74 and policy information base 76 are shown as directly connected to access router 16. It will be understood that upgrade manager 74 and policy information base 76 may be connected to access router 16 through packet network 50, as shown in FIG. 1, or otherwise communicably connected.

Referring to FIG. 2, access router 16 comprises a network access system (NAS) 60, a traffic conditioner 61, a CoS queue set 62 for flows handled by router 16, a set of object links 64 for each sector 34, a scheduler 66, a mobile access system (MAS) 68, and a queue manager 70. The queue manager 70 implements packet flow control and other suitable functionality of the system.

The NAS 60 is communicably connected to the packet network 50 through one or more ports. The NAS 60 receives packets from the network 50. In one embodiment, the NAS 60 labels each packet for routing in the wireless network 12 using MultiProtocol Label Switching (MPLS) labels or any other suitable label. The NAS 60 then forwards the packets to the traffic conditioner 61.

The traffic conditioner 61 stores upgrade information and upgrades the CoS of the packets based on the stored upgrade information. After any upgrades, the traffic conditioner 61 forwards the packets to the appropriate CoS queue 63 in queue set 62. In one embodiment, the traffic conditioner 61 stores upgraded instructions in lookup table 80. The lookup table 80 may include MPLS labels, customer IDs, enhanced CoS designations, and/or any other suitable data that identifies packets for upgrading and the enhanced CoS for the packets. The traffic conditioner 61 may also modify the MPLS label of the incoming packets to upgrade the connection to an enhanced CoS queue 63. As used herein, the term each means every one of at least a subset of the identified items.

The queue sets 62 include aggregate CoS queues 63 for packets handled by the router 16. In a particular embodiment, the queue set 62 comprises a premium (such as expedited forwarding (EF)), an assured forwarding (AF), and a best effort (BE) queue. Queue set 62 may include other or different queues 63. The queues 63 may be any memory, buffer or storage operable to receive and hold packets for processing.

A set of link objects 64 is provided for each sector 34. The link object sets 64 include a link object 65 for each CoS supported by corresponding sector 34. Each link object 65 includes a pointer 67 for each connection that is used by the scheduler 66 to identify and/or retrieve packets from the queue 63 for the connection in each sector 34.

The scheduler 66 controls the timing of packet transmittal on a per sector 34 basis. The scheduler 66 may also perform other packet processing functions. The scheduler 66 respects packet flow time-to-send and sector time-to-send.

The mobile access system (MAS) 68 communicates with the BSC 32 or other elements of the network 12 to track the location, and changes thereof, of the mobile devices 36. The MAS 68 also transmits packets received from the scheduler 66 to the corresponding sector 34.

The queue manager 70 creates and manages the queue sets 62 and object links 67 in object link sets 64. The queue manager 70 ensures compliance, monitors congestion, and manages drops to control congestion. The queue manager may also compute a floating average of a queue size or determine a current queue size for the CoS in the sector. In accordance with a particular embodiment of the present invention, the queue manager 70 may comprise a computer program executing on a processor card.

The policy information base 76 stores service level information for users of the wireless network 12. The service level information includes service, quality and/or service level agreement (SLA) parameters for user connections as well as rate and other subscription information. The SLA record may include a Quality of Service (QoS) policy, rate information for the associated customer, and upgradability of the user's service policy. The QoS identifies a CoS for user connections, such as drops, delays, jitters and other limits for the user connections. The CoS may be any identifier that distinguishes one set of connections from another, including bandwidth availability, usage fees, or data application performance. The upgradable user service policy identifies a customer as enabled to upgrade his CoS. It may also provide upgrade criteria, such as improvement threshold to be met before the connection upgrade will be upgraded. The customer may pay for upgradable policy or may pay by actual upgrades.

The upgrade manager 74 selects connections in congested CoS queues 63 for upgrading to enhanced CoS queues 63. In a particular embodiment, upgrading is triggered based on congestion of a CoS queue 63. In this embodiment, if the best effort queue 63 is congested, assured queue 63 and premium queue 63 are enhanced queues that might be selected for an upgradable communications session. As used herein, the term enhanced CoS queue means every one of at least a subset of queue set 62 with normally enhanced service. The upgrade manager 74 is communicably connected to the policy information base 76 and access router 16. In accordance with a particular embodiment of the present invention, the upgrade manager 74 may be a computer program executing on a processor card or other similar media.

In operation, packets from the packet network 50 are labeled by the NAS 60 and divided into device flows 82 based on MPLS labels. Packet are then forward to traffic conditioner 61. At traffic conditioner 61, packets are upgraded based on upgrade instructions in LUT 80.

Packets are forwarded to set of queues 62 by the traffic conditioner 61 and placed in corresponding queues 63. The packets are pulled by the scheduler 66 through the object link set 64 to the MAS 68 and then transmitted to the mobile device 36. As the mobile device 36 moves to a new sector, it is tracked by the BSC 32. When such a move occurs, the MAS 68 receives an end-of-handoff signal, and the MAS 68 in turn transmits the end-of-handoff message to the NAS 60. A signal message indicating the move is then sent by NAS 60 to the queue manager 70. In a particular embodiment, the NAS 60 marks incoming packets with labels corresponding to the current sector.

To handle congestion, queue manager 70 monitors queues 63 packet congestion by determining the number of dropped packets, determining each CoS queue size, or any other method of determining queue congestion. Upon finding a congested queue, queue manager 70 notifies the upgrade manager 74 of a particular CoS queue 63 that is congested. The upgrade manager 74 queries the queue manager 70 to determine whether bandwidth is available in any of the queues 63 for enhanced service classes. Such queries might include determining the available queue size of an enhanced CoS queue 63, estimating the increase in performance for a communications session upgraded to the enhanced CoS queue 63, or any other query capable of providing the upgrade manager 74 with the enhanced CoS queue 63 information.

The upgrade manager 74 accesses policy information base 76. Next, the upgrade manager 74 determines if the service policies associated with connections in the congested queue are upgradable. In a particular embodiment, the upgrade manager 74 then selects one or more upgradable communications sessions and communicates the results to and thus programs, the lookup table 80.

As traffic conditioner 61 receives packets, it queries lookup table 80 and compares the results to the incoming packets. In a particular embodiment, any packet label and/or user ID that matches an entry in the lookup table 80 is modified so that the packet is routed to the enhanced CoS queue 63.

FIG. 3 illustrates an IP packet 200 with a MPLS label 202 in accordance with one embodiment of the present invention. In this embodiment, packet 200 comprises a MPLS label 202, an IP header 206, a TOS byte 204, a text frame 208, and a trailer frame 210. The MPLS label 202 is a label that is attached to the IP packet header 206. The IP header 206 may contain information such as destination address, length of packet, source address, and TOS byte 204. The TOS byte 204 is a portion of the IP header 206 and is used to identify the CoS. The text 208 includes the data being communicated from one network device to another. The trailer 210 might include error detection or correction bits.

In operation, NAS 60 adds the MPLS label 200 to the packet 200. NAS 60 may also write the TOS byte 204 into the IP header 206. NAS 60 then communicates the packet to the traffic conditioner 61. The traffic conditioner 61 looks at the lookup table 80 to determine if the MPLS label matches a record in the lookup table 80. If the record is found, then traffic conditioner 61 will update the TOS byte 204 to represent the enhanced CoS that is contained in the record of lookup table 80.

FIG. 4 illustrates a method for allowing service class upgradability on the wireless network of FIG. 1 in accordance with one embodiment of the present invention. At any decisional step in FIG. 4, it is to be understood that if the No branch is taken, then the flowchart proceeds to the end and no further steps are taken. The method begins at step 100 in which the queue manager 70 determines that a CoS queue 63 is congested and notifies the upgrade manager 74. The congested CoS may be identified based on dropped packets, a floating window average of a queue size, a current queue size for the CoS in the sector, or any other suitable criteria.

In step 102, the upgrade manager 74 queries the queue manager 70 to determine if there is bandwidth available at the enhanced CoS queue 63. Bandwidth may be available when the enhanced CoS is uncongested, when it provides a measurable and/or significant performance enhancement, or in other suitable situations. As previously described, in response to such a query the queue manager 70 may determine the available queue size of the enhanced CoS queue 63, estimate the increase in performance for a communication system upgraded to the enhanced CoS queue 63, or determine the current number of communication sessions in the enhanced CoS queue 63. By proceeding with the upgrade only in response to congestion and when bandwidth is available in an enhanced CoS, the connection is only upgraded when an enhancement in performance is available. Performance enhancement may be otherwise determined. In addition, the decision to upgrade may be based on other suitable criteria.

If there is bandwidth available at the enhanced CoS queue 63, the Yes branch leads to step 104 in which the upgrade manager 74 accesses policy information base 76. The upgrade manager 74 determines if there are upgradable connections by accessing upgradable service policy information held in policy information base 76. If there are communications sessions capable of being upgraded, then the upgrade manager 74 will identify the first upgradable connection at step 106. Once the first upgradable communications session is identified by the upgrade manager 74, the selected connection is communicated to access router 16.

At step 108, the upgrade manager 74 writes the result to the lookup table 80 included in traffic conditioner 61. This may be accomplished by adding a record that includes the customer ID, MPLS table, and the enhanced CoS to the lookup table 80.

At decisional step 110, if the queue manager 70 determines that there is remaining congestion in the CoS, then access router 16 notifies the upgrade manager 74. In step 112, the upgrade manager 74 queries the queue manager 70 to determine if there is remaining bandwidth available at the enhanced CoS queue 63.

If there is remaining bandwidth available at the enhanced CoS queue 63, the Yes branch leads to step 114 in which the upgrade manager 74 accesses policy information base 76. The upgrade manager 74 determines if there are additional upgradable connections by accessing upgradable service policy information held in policy information base 76. If there are further communications sessions capable of being upgraded, then the upgrade manager 74 will identify the next upgradable connection at step 116. Once the next upgradable communications session is identified by the upgrade manager 74, the selected connection is communicated to access router 16. As previously described, the upgrade manager 74 may communicate the result to a lookup table 80 included in traffic conditioner 61. At step 108, the traffic conditioner 61 upgrades the selected communication session to the enhanced CoS. Steps 108 through 116 may occur one or more times as needed or designed.

FIG. 5 illustrates a method for upgrading service class for a connection at call establishment in accordance with one embodiment of the present invention. Thus a connection may be an established connection and a requested connection. The method begins at step 300 in which the access router 16 receives a connection request from a network device.

At step 310, the access router 16 retrieves the service policy associated with the connection request. Access router 16 communicates with policy information base 76 to request the service policy stored in policy information base 76.

Next, at step 320, access router utilizes the upgrade manager 74 to determine the base CoS for the connection request. Using the base CoS, the upgrade manager 74 determines if the connection can be upgraded to a new CoS at decisional step 330. If the connection is not upgradable, then the connection is established at the base CoS at step 370. This occurs when the upgrade manager send the base CoS to the NAS 60. NAS 60 then labels packet 200 with the proper base TOS 204 byte and the connection is established.

If the connection is upgradable, then at step 340, the upgrade manager determines the enhanced CoS. Next, at step 350, the upgrade manager 74 communicates with the queue manager 70 to determine the available performance increase. At decisional step 360, the upgrade manager 74 analyzes the availability of performance increase and, based on various criteria, whether to upgrade the connection. The various criteria could include packet delay of at least one of the base service class and the upgraded service class, packet drops at both of the base service class and the upgraded service class, a floating window average of the packet queue size for a sector of a wireless network in which the connection is to be established, or any other measured and forecasted criteria for both the base service class and the upgraded service class. Again, if the No branch is taken, then the connection is established at the base CoS at step 370.

Otherwise, if the upgrade manager 74 determines that upgrading the connection is to be done, the method proceeds to step 380 where the connection is established at the enhanced CoS. Upgrade manager 74 communicates the requisite service policy information to lookup table 80, where the information is then stored, and the connection is established. In this embodiment, the information stored in the lookup table 80 includes the enhanced CoS, the customer ID, and a MPLS label. NAS 60 receives the packets from the connection, labels them with a base MPLS, and forwards the labeled packets to traffic conditioner 61. Traffic conditioner 61 utilizes the lookup table 80 to modify the TOS byte on the incoming packets and send the packets to the enhanced CoS queue sets 62. Access router 16 may then communicate the customer ID, the enhanced CoS, remaining bandwidth or any other performance or revenue-generating data to server 52.

Although the present invention has been described in several embodiments, a myriad of changes and modifications may be suggested to one skilled in the art, and it is intended that the present invention encompass such changes and modifications as fall within the scope of the present appended claims.

What is claimed is:

1. A method for determining a service class for a connection to be established, comprising:
   determining a base service class for the connection;
   determining an upgraded service class for the connection;
   determining whether a performance increase is available to the connection by upgrading its service class from the base service class to the upgraded service class;
   estimating the performance increase available to the connection by upgrading its service class from the base service class to the upgraded service class; and
   upgrading the service class if the performance increase meets an upgraded criteria.

2. The method of claim 1, further comprising determining the base service class and the upgraded service class for the connection from a service policy associated with the connection.

3. The method of claim 1, further comprising determining the performance increase available to the connection by upgrading its service class from the base class to the upgraded class based on packet delay of at least one of the base service class and the upgraded service class.

4. The method of claim 3, further comprising determining the performance increase available to the connection by upgrading its service class from the base class to the upgraded class based on packet delay at both of the base service class and the upgraded service class.

5. The method of claim 3, further comprising determining the performance increase available to the connection by upgrading its service class from the base class to the upgraded class based on packet drop of at least one of the base service class and the upgraded service class.

6. The method of claim 3, further comprising determining the performance increase available to the connection by upgrading its service class from the base class to the upgraded class based on packet drops at both of the base service class and the upgraded service class.

7. The method of claim 3, further comprising determining the performance increase available to the connection by upgrading its service class from the base class to the upgraded class based on a current packet queue size of each of the base and the upgraded service classes for a sector of a wireless network in which the connection is to be established.

8. The method of claim 3, further comprising determining the performance increase available to the connection by upgrading its service class from the base class to the upgraded class based on a floating window average of the packet queue size for a sector of a wireless network in which the connection is to be established.

9. The method of claim 3, further comprising determining the performance increase available to the connection by upgrading its service class from the base class to the upgraded class based on both measured and forecasted criteria for both of the base service class and the upgraded service class.

10. A Software for determining a service class for a connection to be established, the software embodied in a computer readable medium and operable to:
   determine a base service class for the connection, connection:
   determine an upgraded service class for the connection;
   determine whether a performance increase is available to the connection by upgrading its service class from the base service class to the upgraded service class:
   estimate the performance increase available to the connection by upgrading its service class from the base service class to the upgraded service class; and
   upgrade the service class if the performance increase meets an upgraded criteria.

11. The software of claim 10, the software further operable to determine the base service class and the upgraded service class for the connection from a service policy associated with the connection.

12. The system software of claim 10, the software further operable to determine the performance increase available to the connection by upgrading its service class from the base class to the upgraded class based on packet delay of at least one of the base service class and the upgraded service class.

13. The software of claim 12, the software further operable to determine the performance increase available to the connection by upgrading its service class from the base class to the upgraded class based on packet delay at both of the base service class and the upgraded service class.

14. The software of claim 12, the software further operable to determine the performance increase available to the connection by upgrading its service class from the base class to the upgraded class based on packet drop of at least one of the base service class and the upgraded service class.

15. The software of claim 12, the software further operable to determine the performance increase available to the connection by upgrading its service class from the base class to the upgraded class based on packet drops at both of the base service class and the upgraded service class.

16. The software of claim 12, the software further operable to determine the performance increase available to the connection by upgrading its service class from the base class to the upgraded class based on a current packet queue size of each of the base and the upgraded service classes for a sector of a wireless network in which the connection is to be established.

17. The software of claim 12, the software further operable to determine the performance increase available to the connection by upgrading its service class from the base class to the upgraded class based on a floating window average of the packet queue size for a sector of a wireless network in which the connection is to be established.

18. The software of claim 12, the software further operable to determine the performance increase available to the connection by upgrading its service class from the base class to the upgraded class based on both measured and forecasted criteria for both of the base service class and the upgraded service class.

* * * * *